United States Patent
Balaji et al.

(10) Patent No.: US 11,964,872 B2
(45) Date of Patent: Apr. 23, 2024

(54) PROCESS AND REACTOR FOR CONVERTING CARBON DIOXIDE INTO CARBON MONOXIDE

(71) Applicant: SHELL OIL COMPANY, Houston, TX (US)

(72) Inventors: Sayee Prasaad Balaji, Amsterdam (NL); Mark Klokkenburg, Amsterdam (NL); Robert Schouwenaar, Amsterdam (NL); Jose Atilio Quevedo Enriquez, Amsterdam (NL)

(73) Assignee: Shell USA, INC., Houston, TX (US)

( * ) Notice: Subject to any disclaimer, the term of this patent is extended or adjusted under 35 U.S.C. 154(b) by 452 days.

(21) Appl. No.: 17/299,425

(22) PCT Filed: Nov. 29, 2019

(86) PCT No.: PCT/EP2019/083047
§ 371 (c)(1),
(2) Date: Jun. 3, 2021

(87) PCT Pub. No.: WO2020/114899
PCT Pub. Date: Jun. 11, 2020

(65) Prior Publication Data
US 2022/0048776 A1  Feb. 17, 2022

(30) Foreign Application Priority Data
Dec. 3, 2018 (EP) .................... 18209749

(51) Int. Cl.
*C01B 32/40* (2017.01)
*C01B 3/32* (2006.01)

(52) U.S. Cl.
CPC ............. *C01B 32/40* (2017.08); *C01B 3/32* (2013.01); *C01B 2203/0283* (2013.01);
(Continued)

(58) Field of Classification Search
CPC ..................................................... C01B 32/40
See application file for complete search history.

(56) References Cited

U.S. PATENT DOCUMENTS

| 2,898,204 A | 8/1959 | Totzek |
| 3,723,344 A | 3/1973 | Reynolds |

(Continued)

FOREIGN PATENT DOCUMENTS

| AU | 472920 B2 | 6/1976 |
| CN | 109201048 A | 1/2019 |

(Continued)

OTHER PUBLICATIONS

Office Action Received for Chinese Application No. 201980075239. 6, dated Feb. 10, 2023, 17 Pages (9 Pages of English Translation and 8 Pages of Official Copy).
(Continued)

*Primary Examiner* — Stuart L Hendrickson
(74) *Attorney, Agent, or Firm* — Shell USA, INC.

(57) ABSTRACT

A process for converting carbon dioxide and hydrogen into a product stream comprising carbon monoxide, water and hydrogen by introducing carbon dioxide, hydrogen and oxygen into a reaction vessel, and performing a reverse water gas shift reaction at elevated temperature, wherein
 (a) no catalyst is present in vessel
 (b) gas stream comprising carbon dioxide, a hydrogen and an oxygen rich gas stream are introduced into the vessel in separate feed streams,
 (c) the hydrogen and oxygen rich gas stream being introduced in close vicinity of each other, via burner comprising coaxial channels wherein gases undergo a combustion reaction, providing the heating energy required for the reverse water-gas shift reaction; and
 (d) the temperature in vessel is in the range of 1000 to 1500° C. by varying the molar ratio of hydrogen to oxygen.

(Continued)

It is useful in reducing the carbon footprint of certain industrial technologies, and in production of synthesis gas.

9 Claims, 5 Drawing Sheets

(52) U.S. Cl.
CPC .......... *C01B 2203/0872* (2013.01); *C01B 2203/1205* (2013.01); *C01B 2203/1258* (2013.01)

(56) References Cited

U.S. PATENT DOCUMENTS

| | | |
|---|---|---|
| 3,738,940 A | 6/1973 | Auer et al. |
| 3,919,114 A | 11/1975 | Reynolds |
| 5,496,530 A | 3/1996 | Vannby et al. |
| 5,714,657 A | 2/1998 | Devries |
| 7,090,789 B2 | 8/2006 | Schioedt et al. |
| 7,435,759 B2 | 10/2008 | Jung et al. |
| 7,498,001 B2 | 3/2009 | Tonkovich et al. |
| 7,846,979 B2 | 12/2010 | Rojey et al. |
| 7,906,098 B2 | 3/2011 | Kuperman et al. |
| 8,658,554 B2 | 2/2014 | Dorner et al. |
| 9,249,079 B2 | 2/2016 | Mamedov et al. |
| 2006/0211777 A1 | 9/2006 | Severinsky |
| 2009/0012188 A1 | 1/2009 | Rojey et al. |
| 2009/0224209 A1 | 9/2009 | Eilers et al. |
| 2009/0313886 A1 | 12/2009 | Hinman et al. |
| 2010/0000874 A1 | 1/2010 | Hinman et al. |
| 2010/0292076 A1 | 11/2010 | Wagner et al. |
| 2013/0034478 A1 | 2/2013 | Doty |
| 2014/0127121 A1 | 5/2014 | Maass et al. |
| 2014/0288195 A1 | 9/2014 | Castelli et al. |
| 2014/0315711 A1 | 10/2014 | Kumar et al. |
| 2015/0129805 A1 | 5/2015 | Karpenko et al. |
| 2015/0307352 A1 | 10/2015 | Kumar et al. |
| 2015/0336795 A1 | 11/2015 | Kern et al. |
| 2016/0052785 A1 | 2/2016 | Maass et al. |
| 2016/0296916 A1 | 10/2016 | Kim et al. |
| 2016/0332874 A1 | 11/2016 | Mamedov |
| 2017/0080407 A1 | 3/2017 | Schunk et al. |
| 2017/0197829 A1 | 7/2017 | Andersen |
| 2018/0327261 A1 | 11/2018 | Ott et al. |
| 2019/0359894 A1 | 11/2019 | Heidel et al. |
| 2021/0246034 A1 | 8/2021 | Kaisalo et al. |
| 2022/0048776 A1 | 2/2022 | Balaji et al. |

FOREIGN PATENT DOCUMENTS

| | | |
|---|---|---|
| DE | 102015015968 A1 | 6/2017 |
| EP | 3050865 A1 | 8/2016 |
| FR | 2963932 A1 | 2/2012 |
| JP | 3834621 B2 | 10/2006 |
| JP | 5402683 B2 | 1/2014 |
| KR | 101864602 B1 | 6/2018 |
| WO | 9709293 A1 | 3/1997 |
| WO | 2013135664 A1 | 9/2013 |
| WO | 2014180888 A1 | 11/2014 |
| WO | 2015011114 A1 | 1/2015 |
| WO | 2017067648 A1 | 4/2017 |
| WO | 2017072649 A1 | 5/2017 |
| WO | 2017077421 A1 | 5/2017 |
| WO | 2017092873 A1 | 6/2017 |
| WO | 2018219986 A1 | 12/2018 |

OTHER PUBLICATIONS

International Search Report and Written Opinion received for PCT Patent Application No. PCT/EP2019/083047, dated Jan. 27, 2020, 10 pages.

Vazquez et al., "Catalyst Screening and Kinetic Modeling for CO Production by High Pressure and Temperature Reverse Water Gas Shift for Fischer-Tropsch Applications", Industrial & Engineering Chemistry, vol. 56, Issue No. 45, pp. 13262-13272.

International Search Report and Written Opinion received for PCT Patent Application No. PCT/EP2021/064403, dated Aug. 10, 2021, 11 pages.

International Search Report and Written Opinion received for PCT Patent Application No. PCT/EP2021/086210, dated Mar. 23, 2022, 11 pages.

Ye et al., "Effect of modifiers on the activity of a Cr2O3/Al2O3catalyst in the dehydrogenation of ethylbenzene with CO2", Green Chemistry, Issue 7, May 31, 2005, pp. 524-528.

International Search Report and Written Opinion received for PCT Patent Application No. PCT/EP2021/064385, dated Aug. 6, 2021, 11 pages.

Zonetti et al., "The NixCe0.75Zr0.25-xO2 Solid Solution and the RWGS", Applied Catalysis A: General, Apr. 5, 2014, vol. 475, pp. 48-54.

Su et al., "Designing of Highly Selective and High-temperature Endurable Rwgs Heterogeneous Catalysts: Recent Advances and the Future Directions", Journal of Energy Chemistry, Sep. 2017, vol. 26, Issue No. 5, pp. 854-867.

Meiri et al., "Simulation of Novel Process of Co2 Conversion to Liquid Fuels", Journal of Co2 Utilization, Jan. 1, 2017, vol. 17, pp. 284-289.

Wolf et al., "Syngas Production via Reverse Water-gas Shift Reaction Over a Ni-al2o3 Catalyst: Catalyst Stability, Reaction Kinetics, and Modeling", Chemical Engineering & Technology, Jun. 1, 2016, vol. 39, Issue No. 6, pp. 1040-1048.

Lee et al., "The Power of Molten Salt in Methane Dry Reforming: Conceptual Design With a Cfd Study", Chemical Engineering and Processing—Process Intensification, 2021, vol. 159, Issue No. 11, 14 Pages.

Bustamantel et al., "Kinetic Study of the Reverse Water Gas Shift Reaction in High Temperature High Pressure Homogeneous Systems", Fuel Chemistry Division Preprints, Aug. 2002, vol. 47, Issue No. 2, pp. 663-664.

PROCESS AND REACTOR FOR CONVERTING CARBON DIOXIDE INTO CARBON MONOXIDE

CROSS REFERENCE TO RELATED APPLICATIONS

This is a National stage application of International application No. PCT/EP2019/083047, filed 29 Nov. 2019, which claims priority of European application No. 18209749.3, filed 3 Dec. 2018, which is incorporated herein by reference in its entirety.

FIELD OF THE INVENTION

The present invention relates to a process for converting carbon dioxide and hydrogen into a product stream comprising carbon monoxide, water and hydrogen. Further, the present invention relates to a reverse water-gas shift process unit, suitable for use in said process.

The process and process unit are useful in reducing the carbon footprint of certain industrial technologies. Further, the process and process unit are useful in the production of synthesis gas.

BACKGROUND OF THE INVENTION

The increased demand for energy resulting from worldwide economic growth and development have contributed to the release of greenhouse gases into the atmosphere. The increase in concentration of greenhouse gases, especially carbon dioxide has resulted in global warming. It is imperative to reduce the global carbon footprint to mitigate global warming and this has been regarded as one of the most important challenges facing mankind in the 21$^{st}$ century. The capacity of the earth system to absorb greenhouse gas emissions is already exhausted, and under the Paris climate agreement, current emissions must be fully stopped until around 2070. To realize these reductions, the energy scenario of the world must evolve to move away from conventional carbon-based fossil fuel energy carriers and also decrease the carbon dioxide concentration in the atmosphere. A timely implementation of the energy transition requires multiple approaches in parallel. For example, energy conservation, improvements in energy efficiency and electrification play a role, but also efforts to use carbon dioxide to produce other compounds plays an important role as a substitute for fossil fuel-based feedstock. For example, synthesis gas (i.e. a mixture of hydrogen and carbon monoxide) may be produced from carbon dioxide. Synthesis gas is a building block to produce several useful chemicals and fuels.

Historically, synthesis gas is usually produced from steam reforming using for example natural gas as feedstock or partial oxidation of coal or heavy oil residue feedstock. All these processes involve the production of carbon dioxide as a by-product of the steam reforming reactions or partial oxidation reactions. In order to truly decrease the carbon dioxide concentrations, utilization of fossil fuel-based feedstock is not a viable solution. As an alternative, the reverse water gas shift (RWGS) reaction may be used to prepare syngas, using carbon dioxide as a starting material. However, the reaction of carbon dioxide with hydrogen via the RWGS reaction to produce carbon monoxide and water is endothermic in nature. Sufficient thermal energy must be supplied to the reactants (i.e. carbon dioxide and hydrogen) to facilitate the endothermic RWGS reaction. Substantial carbon monoxide is produced from carbon dioxide at temperatures beyond 600° C. reaching a maximum at temperatures around 1200° C. RWGS reaction at lower temperatures at around 600-1000° C. require catalysts to enable the conversion of carbon dioxide to carbon monoxide. These catalysts must be able to withstand high temperatures as well as be resistant to catalyst poisons such as compounds containing sulphur.

Currently, the status of RWGS developments have been on lab scale (Catalyst Screening and Kinetic Modeling for CO Production by High Pressure and Temperature Reverse Water Gas Shift for Fischer-Tropsch Applications, Francisco Vidal Vazquez, Peter Pfeifer, Juha Lehtonen, Paolo Piermartini, Pekka Simell and Ville Alopaeus, Ind. Eng. Chem. Res. 2017, 56, 13262-13272; Kinetic study of the reverse water gas shift reaction in high-temperature, high pressure homogeneous systems, Felipe Bustamantel, Robert Enick, Kurt Rothenberger, Bret Howard, Anthony Cugini, Michael Ciocco and Bryan Morreale, Fuel Chemistry Division Preprints 2002, 47(2), 663). For large scale conversion of carbon dioxide there is a need to be able to more efficiently and economically carry out the RWGS reaction. Achieving high conversion of carbon dioxide selectively to carbon monoxide and avoiding by-products like methane and carbon formation requires high temperatures of around 1200° C. which necessitates high heat transfer from external furnaces which pose considerable engineering challenges while scaling up to large scales. It is therefore imperative that a novel RWGS process is required to efficiently convert carbon dioxide to carbon monoxide at high temperatures at a large scale.

The process of the present disclosure provides a solution to said need.

SUMMARY OF THE INVENTION

Accordingly, the present disclosure relates to a process for converting carbon dioxide and hydrogen into a product stream comprising carbon monoxide, water and hydrogen, the process comprising introducing carbon dioxide, hydrogen and oxygen into a reaction vessel, and performing a reverse water gas shift reaction at elevated temperature, wherein (a) no catalyst is present in the reaction vessel, and (b) at least a gas stream comprising carbon dioxide, a hydrogen rich gas stream and an oxygen rich gas stream are introduced into the reaction vessel in separate feed streams, wherein the hydrogen rich gas stream is introduced into the reaction vessel at a temperature between 15 and 450° C., (c) the hydrogen rich gas stream and oxygen rich gas stream being introduced in close vicinity of each other, but preferably not next to each other, wherein at least the hydrogen rich gas stream and the oxygen rich gas stream are introduced into the reaction vessel via a burner comprising coaxial channels for the separate introduction of the different gas streams, the burner being located at the top of the reaction vessel, wherein the hydrogen and oxygen in the hydrogen rich gas stream and oxygen rich gas stream undergo a combustion reaction upon entering the reaction vessel, thereby providing the heating energy required for the reverse water-gas shift reaction; and (d) the temperature in the reaction vessel is maintained in the range of 1000 to 1500° C. by varying the molar ratio of hydrogen to oxygen, which are introduced into the reaction vessel in the hydrogen rich gas stream and oxygen rich gas stream, respectively.

According to the presently claimed process, the use of a catalyst is not needed, contrary to RWGS processes known in the art. Advantageously, in the present process, the heat required for the reverse water gas shift reaction is provided by the combustion of oxygen and hydrogen inside the reactor.

Further, the present disclosure relates to a reverse water-gas shift process unit comprising at least one reaction vessel operatively connected to a cooling unit, and further comprising a gas introduction line connected to a water splitter unit. According to the present disclosure, the hydrogen and/or oxygen used in the RWGS process may be provided from a water splitting unit, which advantageously may be powered by renewable power sources.

DETAILED DESCRIPTION OF THE DISCLOSURE

The present disclosure relates to a RWGS process for converting a gas stream comprising carbon dioxide into products. According to the present disclosure, the feed streams to the reverse water gas shift reaction vessel comprise several gas streams: at least a gas stream comprising carbon dioxide, a hydrogen rich gas stream and an oxygen rich gas stream. Optionally, additional gas streams may be introduced into the reaction vessel as co-feed or pre-mixed gas streams (i.e. pre-mixed with any of the other gas streams), such as, but not limited to, streams comprising off-gases or natural gas.

A gas stream comprising carbon dioxide herein means a gas stream comprising from 1% to 100% carbon dioxide by volume. Sources of the carbon dioxide may be diverse, such as for example, but not limited to carbon dioxide captured from air or from flue gases, off-gases, and the like. The gas stream comprising carbon dioxide comprises carbon dioxide and may also comprise other gases, for example, hydrocarbons such as methane, ethane, propane, butane, pentane, inert gases such as argon, other gases such as nitrogen, oxygen, hydrogen, carbon monoxide or combinations of all the mentioned gases thereof. Preferably, the gas stream comprising carbon dioxide contains carbon dioxide in the range of 30 to 100 volume %, and even more preferred 50 to 100 volume %.

The hydrogen rich gas stream comprises hydrogen as a main component, suitably at least 35 volume % of hydrogen, and may optionally comprise other components, such as oxygen, nitrogen, water or combinations thereof. Preferably, the hydrogen rich gas stream comprises high purity hydrogen typically of 50% and higher by volume, particularly 65% and higher by volume, and especially 95% and higher by volume.

The oxygen rich gas stream comprises oxygen, and may optionally comprise other components, such as nitrogen, hydrogen, water or combinations thereof. Preferably, the oxygen rich gas stream comprises of high purity oxygen typically of 70% and higher by volume, particularly 80% and higher by volume, and specifically 90% and higher by volume.

According to the present disclosure, the reverse water gas shift reaction in the reaction vessel takes place at elevated temperature in the range of 1000 to 1500° C., which heat energy is needed to sufficiently activate carbon dioxide with hydrogen and convert it into carbon monoxide and water. Preferably, the temperature is maintained in the range of 1100 to 1300° C. The pressure maintained in the reactor vessel is the range of 1 bar to 80 bar. Preferably, the pressure in the reaction vessel is from 5 to 70 bar.

In the process according to the present disclosure, the hydrogen rich gas stream is introduced into the reaction vessel at a temperature between 15 and 450° C., in particular between 100 and 300° C., more particularly between 150 and 250° C., and especially between 220 and 240° C.

According to the present disclosure, the oxygen rich gas stream is introduced into the reaction vessel at room temperature or at a slightly elevated temperature. Preferably, the oxygen rich gas stream is introduced into the reaction vessel at a temperature between 15 and 450° C., in particular between 100 and 300° C., more particularly between 120 and 280° C., and especially between 220 and 260° C.

According to the present disclosure, the gas stream comprising carbon dioxide is introduced into the reaction vessel at room temperature or at a slightly elevated temperature. Preferably, the gas stream comprising carbon dioxide is introduced into the reaction vessel at a temperature between 15 and 700° C., in particular between 100 and 600° C., more particularly between 150 and 500° C., and especially between 200 and 450° C.

According to the present disclosure, any optional additional gas stream that is introduced into the reaction vessel as co-feed or pre-mixed gas stream, is introduced at room temperature or at a slightly elevated temperature. Preferably, the optional additional gas stream is introduced into the reaction vessel at a temperature between 15 and 500° C., in particular between 50 and 450° C.

In the process according to the present disclosure, the feed streams to the reverse water gas shift reaction vessel, at least the hydrogen rich gas stream and the oxygen rich gas stream are introduced into the reaction vessel via a burner comprising coaxial channels, which may have different slit widths, for the separate introduction of the different gas streams, potentially at different velocities, the ratio of these velocities of gases in the channels being preferably between 1-100, more preferably between 3-40. Preferably, the angle of the burner tip end is between 5-90 degrees, preferably between 20-65 degrees, for each of the coaxial channels. See for example FIGS. 9 and 10. Burners suitable for this purpose are known in the art, such as described in WO2015011114. In the process according to the present disclosure, the burner is located at the top of the reaction vessel.

According to the present disclosure, the hydrogen rich gas stream and the oxygen rich gas stream advantageously undergo an exothermic reaction at the tip of the burner providing the heat energy required for the endothermic reverse water gas shift reaction to occur. Since this reaction is exothermic, the excessive heat energy may cause damage to the burner. In order to prevent the hydrogen rich gas stream and the oxygen rich gas stream from reacting in close vicinity of the burner outlet, part of the gas stream containing carbon dioxide is introduced via a channel in between the hydrogen rich gas stream and the oxygen rich gas stream, the oxygen rich gas stream being introduced via the inner channel(s) of the burner, and the remaining part of the gas stream containing carbon dioxide is introduced in an outer channel of the burner, being outside of the channels for the hydrogen rich gas stream and oxygen rich gas stream, to prevent overheating of the burner due to high heat energy caused by the reaction of the hydrogen rich gas stream and the oxygen rich gas stream inside the reaction vessel. As described above, the temperature of the reaction vessel is maintained at an elevated temperature in the range of 1000 to 1500° C., preferably, in the range of 1100 to 1300° C. The temperature in the reaction vessel is maintained by adjusting the flow of oxygen rich gas to the reaction vessel.

The product stream at the outlet of the reverse water gas shift reaction vessel comprises of carbon monoxide, hydrogen, water, unconverted carbon dioxide, or combinations thereof.

Different downstream applications require different ratio of hydrogen to carbon monoxide in the product stream. The ratio of hydrogen to carbon monoxide by volume at the outlet of the reverse water gas shift reaction vessel is in the range of 0.5 to 5, preferably in the range of 1 to 2. The ratio of the hydrogen to carbon dioxide by volume at the inlet of the reverse water gas shift reaction vessel varies from 1 to 5, preferably between 2 and 3.5. The ratio of hydrogen to carbon dioxide is adjusted such that the required hydrogen to carbon monoxide ratio in the product stream is obtained.

According to the present disclosure, the reverse water gas shift reaction vessel is preferably preheated, in particular in the range from 25° C. up to 1100° C., to initiate the reverse water gas shift reaction. The preheating of the reaction vessel may be performed by recirculating around the reaction vessel a mixture of hot gases resulting, for example, from the combustion of natural gas and air. Alternatively, other options for preheating may be used, like electrically heating. In the process according to the present disclosure, the product stream exiting the reaction vessel is cooled with water to provide a cooled product mixture comprising carbon monoxide, hydrogen, steam and unconverted carbon dioxide. The cooling process advantageously transfers heat energy from the product stream to the cooling water to produce steam. The product stream or the steam produced from cooling water is used to advantageously preheat one or more of the feed streams selected from the gas stream comprising carbon dioxide, hydrogen rich gas stream and oxygen rich gas stream, and optionally additional gas streams introduced into the reaction vessel as co-feed or pre-mixed gas streams that enter the reaction vessel. Alternatively, one or more of the feed streams selected from the gas stream comprising carbon dioxide, hydrogen rich gas stream and oxygen rich gas stream, and optionally additional gas streams can be preheated externally by other forms of heating including electrical heaters. Preheating one or more of these feed streams increases the efficiency of the reverse water gas shift process.

According to the present disclosure, a water splitter can be used to produce at least a part of the hydrogen rich gas stream and the oxygen rich gas stream. A water splitter is a device that splits water into hydrogen and oxygen. Such a water splitter may be, among others, electrolysis of water using electrical energy, photo electrochemical water splitting, photocatalytic water splitting, thermal decomposition of water and other known in the art methods of water splitting. A preferred water splitter is an electrolyzer. Energy sources for the water splitting will advantageously be provided by renewable power sources, such as solar and/or wind energy.

According to the present disclosure, the oxygen rich gas stream from the water splitter can be advantageously liquified, optionally stored, and re-gasified before use as feed.

According to the present disclosure, the cooled product stream comprising carbon monoxide, hydrogen, steam and unconverted carbon dioxide is subjected to further cooling at least to, and beyond, the dew point to provide a gas stream comprising of carbon monoxide, hydrogen, unconverted carbon dioxide and liquid water which can then be separated from the product gas stream. Separators suitable for this purpose are known to people skilled in the art. The liquid water stream thus separated is then recycled back to the water splitter.

As long as the product stream comprising carbon monoxide and hydrogen produced by the process described above, still comprises unconverted carbon dioxide, the product stream advantageously may be repeatedly subjected to said process steps to convert all carbon dioxide present. In the process according to the present disclosure, multiple stages for the reverse water gas shift process are required if further conversion of the unconverted carbon dioxide in the product stream is required. The multiple stages are a repeat of the entire reverse water gas shift process explained above. The cooled product gas stream comprising of carbon monoxide, hydrogen, unconverted carbon dioxide, thus obtained from the first reaction vessel after being subjected to cooling and separation of liquid water, is the feed to a second reverse water gas shift reaction vessel along with one or more feed streams selected from hydrogen rich gas stream and the oxygen rich gas streams from the water splitter. The product stream comprising carbon monoxide, hydrogen, water, unconverted carbon dioxide or combinations thereof, from the second reaction vessel is subjected to further cooling and separation of the liquid water from the cooled product gas stream comprising carbon monoxide, hydrogen and unconverted carbon dioxide. One or more of the feed streams for the second reaction vessel selected from the product stream gas stream comprising carbon dioxide, hydrogen, water, unconverted carbon dioxide, optional additional gas streams introduced into the reaction vessel as co-feed or pre-mixed gas streams, hydrogen rich gas stream and oxygen rich gas stream may be advantageously preheated using any of the preheating methods described above.

The process of this disclosure may advantageously be performed in a reverse water-gas shift process unit comprising at least one reaction vessel operatively connected to a cooling unit, and further comprising a gas introduction line connected to a water splitter unit. When multiple stages for the reverse water gas shift process are required, if further conversion of the unconverted carbon dioxide in the product stream is required, this is preferably performed in a unit comprising at least two reaction vessels, each of which are operatively connected to a cooling unit, which are placed in consecutive order of a first reaction unit followed by a cooling unit and again followed by a reaction unit followed by a cooling unit, and the process unit further comprising at least one gas introduction line connected to a water splitter unit.

The process, or process steps thereof, and process unit(s) of the present invention may advantageously be integrated into processes requiring synthesis gas as a feedstock.

DESCRIPTION OF THE DRAWINGS

In FIG. 3, cooled product stream 4 is used to preheat the gas stream comprising carbon dioxide 1, and steam 6 is used to preheat hydrogen rich gas stream 2 and oxygen rich gas stream 3.

In FIG. 4, cooled product stream 4 is used to preheat the gas stream comprising carbon dioxide 1, and steam 6 is used to preheat hydrogen rich gas stream 2 and oxygen rich gas stream 3. A water splitter is used to produce at least part of the hydrogen rich gas stream 2 and oxygen rich gas stream 3 from water 7 using an energy source 8. Excess oxygen rich gas stream 9 is taken out which can be utilized elsewhere or vented.

In FIG. 4, cooled product stream 4 is used to preheat the gas stream comprising carbon dioxide 1, and steam 6 is used to preheat hydrogen rich gas stream 2 and oxygen rich gas stream 3. A water splitter is used to produce at least part of the hydrogen rich gas stream 2 and oxygen rich gas stream 3 from water 7 using an energy source 8. The cooled product gas stream 4 is further cooled to dew point and liquid water 7 is separated from the cooled product gas stream 13 in a separator. Excess oxygen rich gas stream 9 is taken out which can be utilized or vented.

Hereinafter the invention will be further illustrated by the following non-limiting example.

EXAMPLE 1

Figure 1:
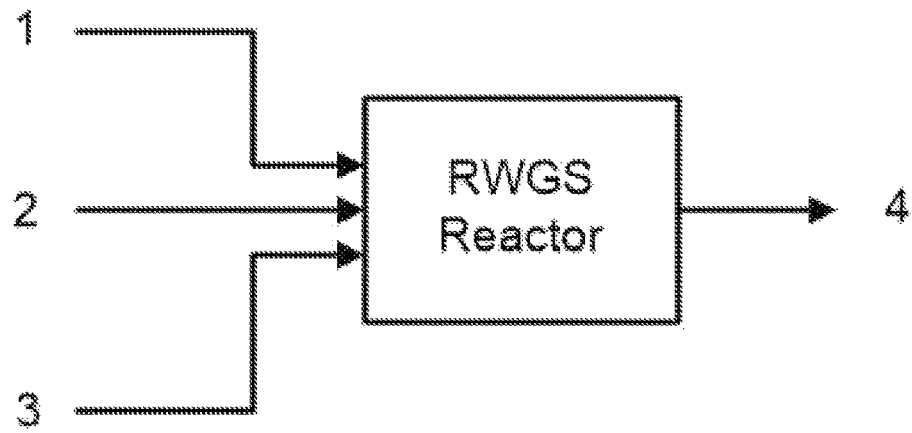
FIG. 1. illustrates an embodiment of the present disclosure of the reverse water gas shift process where the gas stream comprising carbon dioxide 1, hydrogen rich gas stream 2 and oxygen rich gas stream 3 enter the RWGS reactor to form a product gas stream 4 comprising carbon monoxide, hydrogen, water and possibly some unconverted carbon dioxide. Optional additional gas streams are not shown in FIG. 1.
Figure 2:
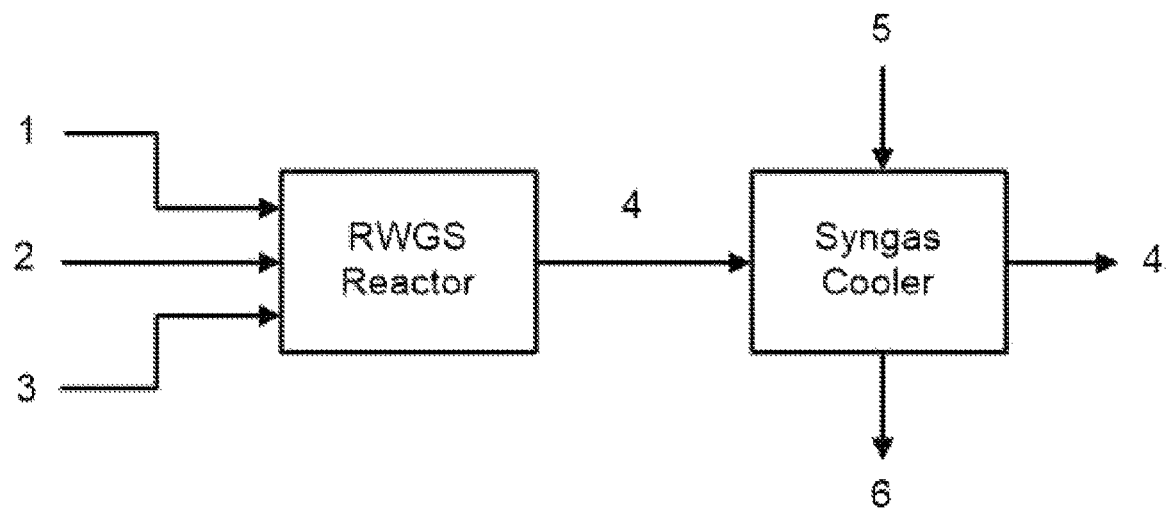
FIG. 2. illustrates another embodiment of the present disclosure where the the gas stream comprising carbon dioxide 1, hydrogen rich gas stream 2 and oxygen rich gas stream 3 enter the RWGS reactor to form a product gas stream 4 comprising carbon monoxide, hydrogen, water and possibly some unconverted carbon dioxide. The product stream 4 is cooled with water 5 to make steam 6.
Figure 3:
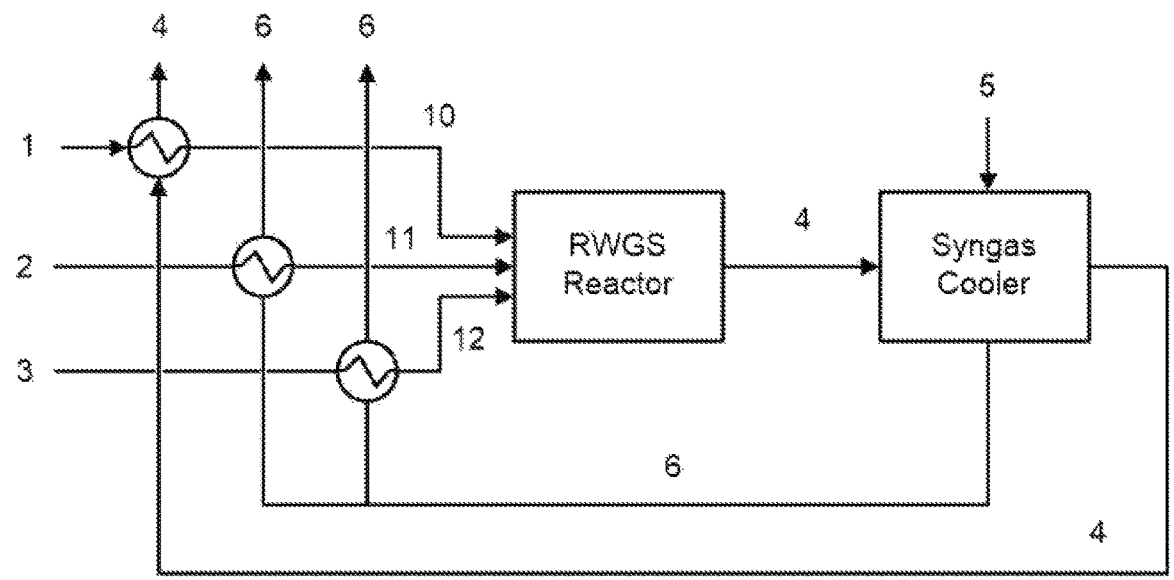
FIG. 3. illustrates another embodiment of the present disclosure where a preheated gas stream containing carbon dioxide 10, preheated hydrogen rich gas stream 11 and preheated oxygen rich gas stream 12 enter the RWGS reactor to form a product gas stream 4 comprising carbon monoxide, hydrogen, water and possibly some unconverted carbon dioxide. The product stream 4 is cooled with water 5 to make steam 6. One or both of the cooled product stream 4 and steam 6 may be used to preheat one or more of the feed streams selected from gas stream comprising carbon dioxide 1, hydrogen rich gas stream 2 and oxygen rich gas stream 3.
Figure 4:
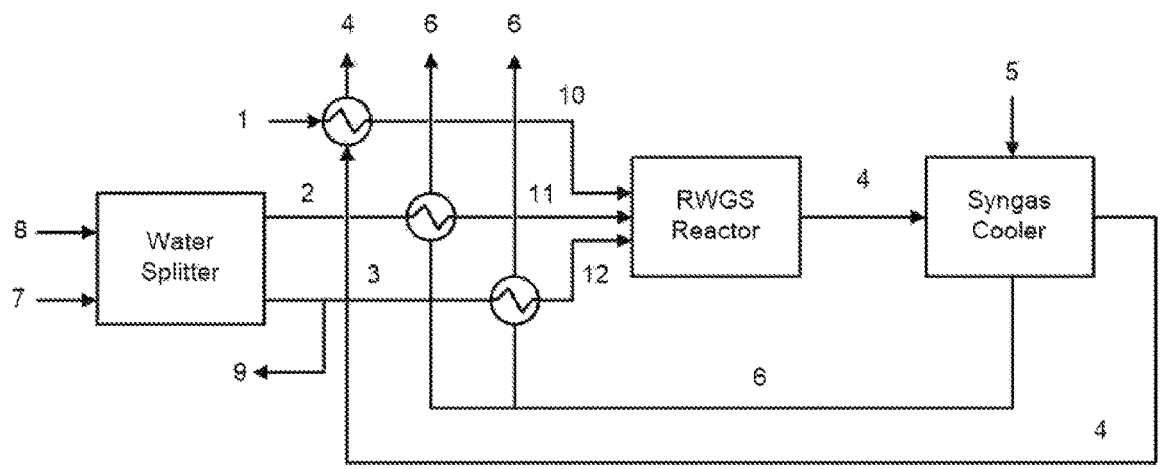
FIG. 4. illustrates another embodiment of the present disclosure where a preheated gas stream comprising carbon dioxide 10, preheated hydrogen rich gas stream 11 and preheated oxygen rich gas stream 12 enter the RWGS reactor to form a product gas stream 4 comprising carbon monoxide, hydrogen, water and possibly unconverted carbon dioxide. The product stream 4 is cooled with water 5 to make steam 6. One or both of the cooled product stream 4 and steam 6 may be used to preheat one or more of the feed streams selected from gas stream comprising carbon dioxide 1, hydrogen rich gas stream 2 and oxygen rich gas stream 3.
Figure 5:
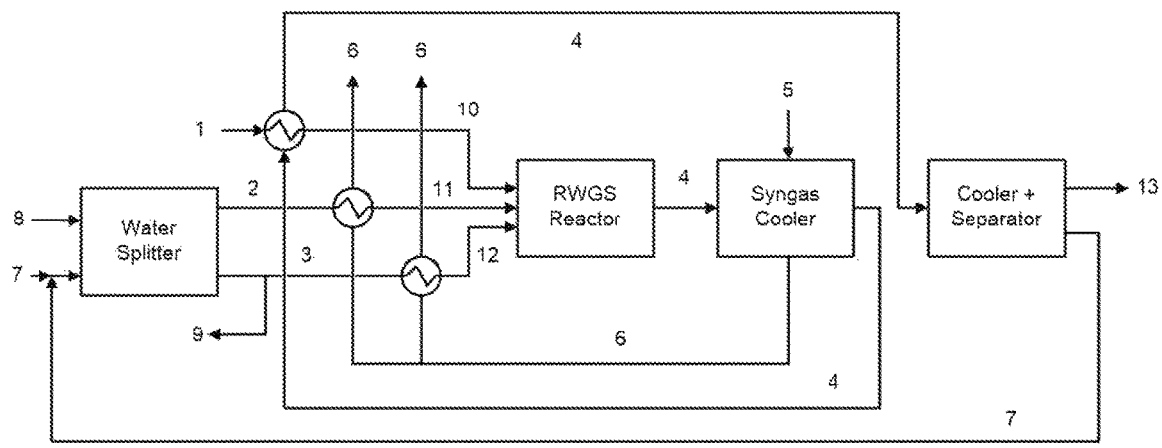
FIG. 5. illustrates another embodiment of the present disclosure where the preheated gas stream comprising carbon dioxide 10, preheated hydrogen rich gas stream 11 and preheated oxygen rich gas stream 12 enter the RWGS reactor to form a product gas stream 4 comprising carbon monoxide, hydrogen, water and possibly unconverted carbon dioxide. The product stream 4 is cooled with water 5 to make steam 6. One or both of the cooled product stream 4 and steam 6 may be used to preheat one or more of the feed streams selected from gas stream comprising carbon dioxide 1, hydrogen rich gas stream 2 and oxygen rich gas stream 3.
Figure 6:
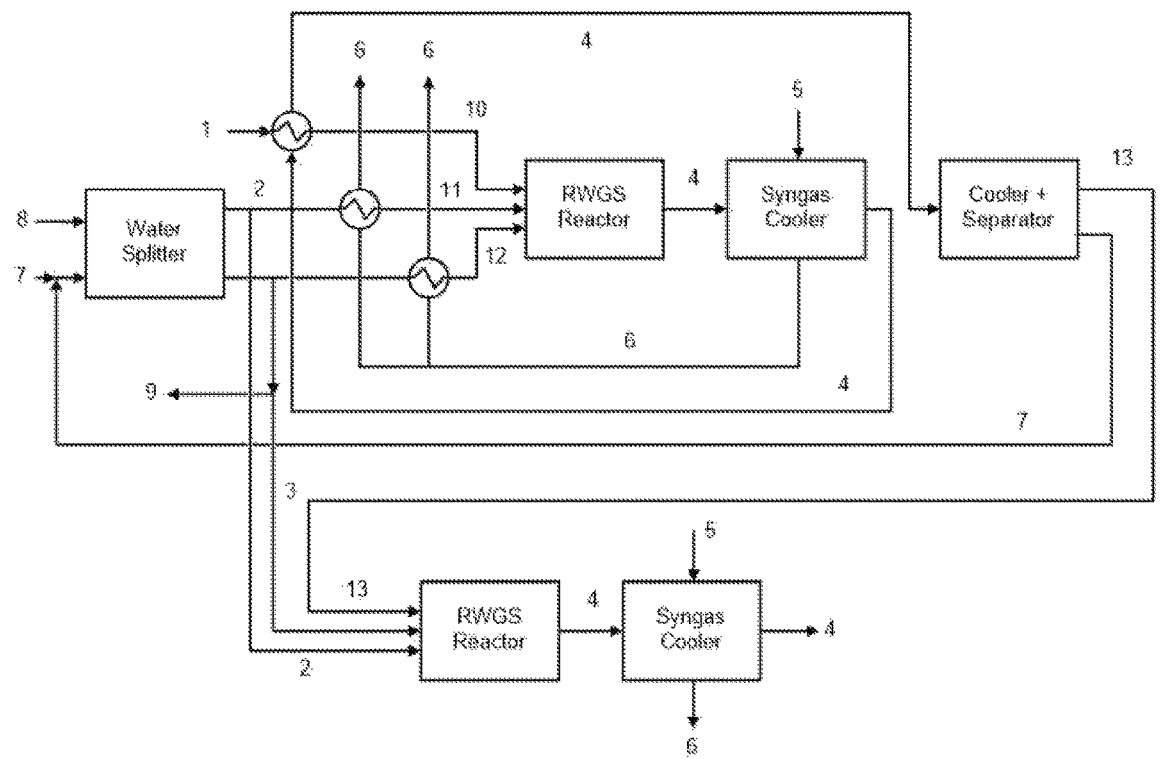
FIG. 6. illustrates another embodiment of the present disclosure where the preheated gas stream comprising carbon dioxide 10, preheated hydrogen rich gas stream 11 and preheated oxygen rich gas stream 12 enter the RWGS reactor to form a product gas stream 4 comprising carbon monoxide, hydrogen, water and unconverted carbon dioxide. The product stream 4 is cooled with water 5 to make steam 6. One or both of the cooled product stream 4 and steam 6 may be used to preheat one or more of the feed streams selected from gas stream containing carbon dioxide 1, hydrogen rich gas stream 2 and oxygen rich gas stream 3. A water splitter is used to produce at least part of the hydrogen rich gas stream 2 and oxygen rich gas stream 3 from water 7 using an energy source 8. The cooled product gas stream 4 is further cooled to dew point and liquid water 7 is separated from the cooled product gas stream 13 in a separator. Unconverted carbon dioxide in the product gas stream 13 is further converted to carbon monoxide by subjecting it to a second stage reverse water gas shift process. The product gas stream 13 along with a hydrogen rich gas stream 2 and oxygen rich gas stream 3 enter the RWGS reactor to form a product gas stream 4 comprising carbon monoxide, hydrogen, water and unconverted carbon dioxide. The product stream 4 is cooled with water 5 to make steam 6. Excess oxygen rich gas stream 9 is taken out which can be utilized or vented.

The following example refers to the processes as explained in the different embodiments of the present disclosure as described in FIG. 1 and FIG. 3. Table 1 illustrates the product stream (main product is synthesis gas) compositions at the outlet of RWGS reaction vessel for different reactor temperatures for two different cases: when the feed streams are not preheated (as illustrated in FIG. 1) and when they are preheated (as illustrated in FIG. 3). The feed H2 to CO2 ratio is constant for all cases. The RWGS reactor temperature is controlled by adjusting the flow of oxygen to the reactor. The synthesis gas composition results were obtained by assuming that the synthesis gas at the outlet of the RWGS reactor is at steady state thermodynamic equilibrium.

Figure 7:
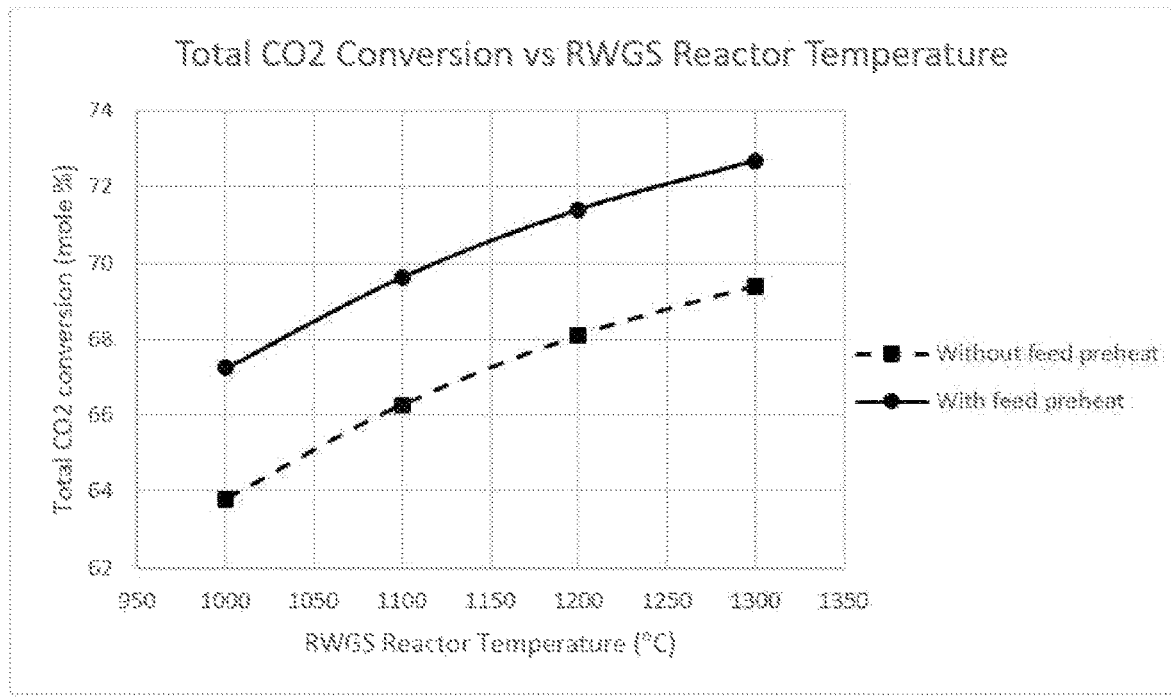
FIG. 7. illustrates the total carbon dioxide conversion at different RWGS reactor temperatures for two different embodiments of the present disclosure as explained in FIG. 1 and FIG. 3.
Figure 8:
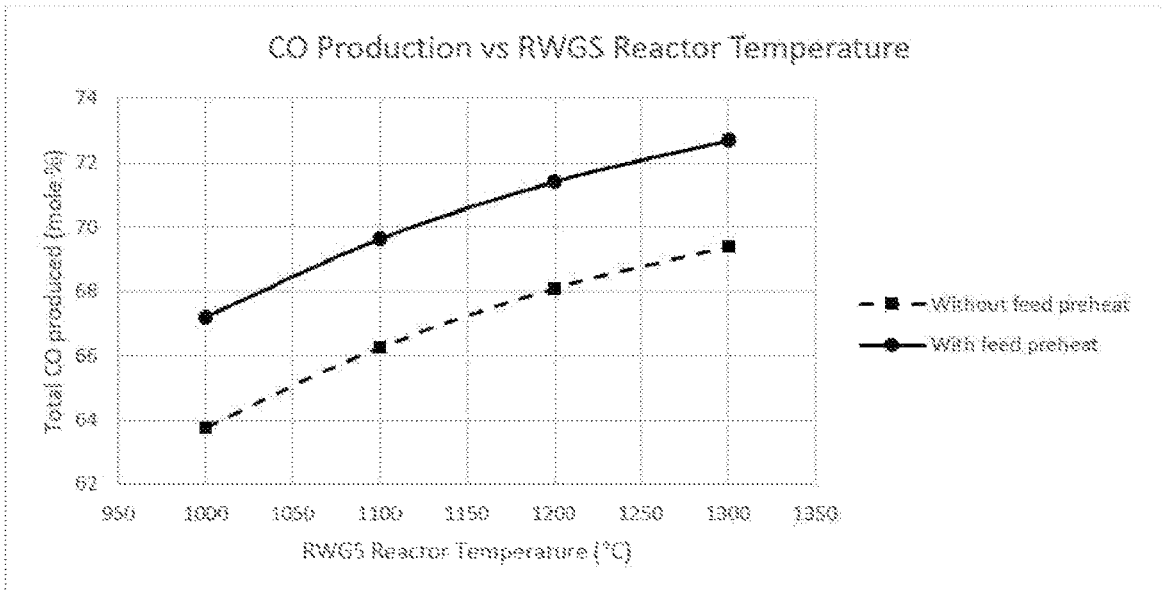
FIG. 8. illustrates the total carbon monoxide production at different RWGS reactor temperatures for two different embodiments of the present disclosure as explained in FIG. 1 and FIG. 3.
Figure 9:
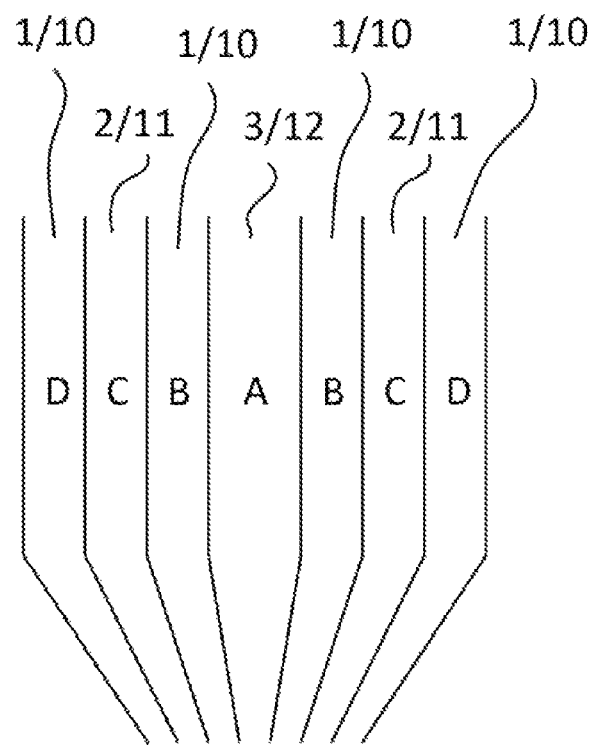
FIG. 9. illustrates an embodiment of a burner that can be used in the process according to the present disclosure. The exemplified burner contains four coaxial channels A, B, C and D, but more channels may also be possible. Oxygen rich gas stream 3 or preheated oxygen rich gas stream 12 (i.e. gas stream 3/12) enters the reaction vessel via channel A of the burner. A portion of the gas stream comprising carbon dioxide 1 or preheated gas stream comprising carbon dioxide 10 (i.e. gas stream 1/10) advantageously enters the reaction vessel via channel B of the burner. Hydrogen rich gas stream 2 or preheated hydrogen rich gas stream 11 (i.e. gas stream 2/11) enters the reaction vessel via channel C of the burner. Another portion of the gas stream comprising carbon dioxide 1 or preheated gas stream comprising carbon dioxide 10 (i.e. gas stream 1/10) enters the reaction vessel via channel D of the burner.
Figure 10:
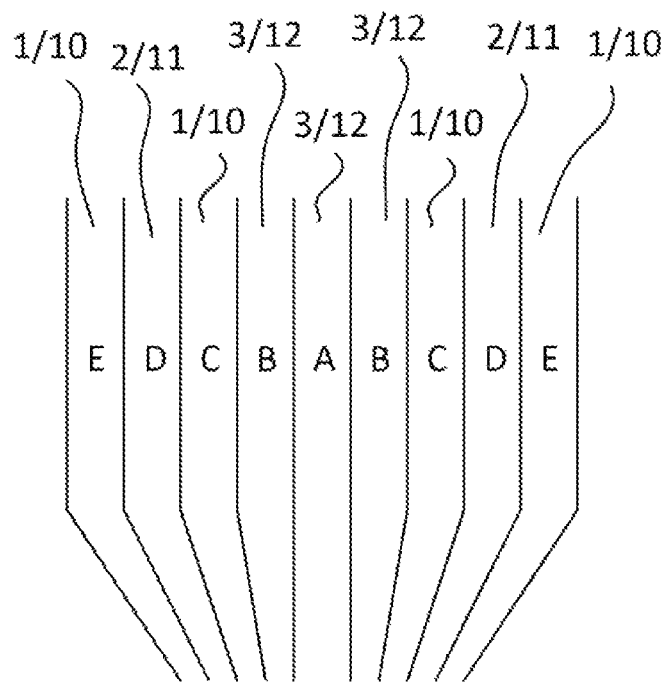
FIG. 10. illustrates another embodiment of a burner that can be used in the process according to the present disclosure. The burner contains five coaxial channels A, B, C, D and E. Oxygen rich gas stream 3 or preheated oxygen rich gas stream 12 (i.e. gas stream 3/12) enters the reaction vessel via channels A and B of the burner. A portion of the gas stream comprising carbon dioxide 1 or preheated gas stream comprising carbon dioxide 10 (i.e. gas stream 1/10) advantageously enters the reaction vessel via channel C of the burner. Hydrogen rich gas stream 2 or preheated hydrogen rich gas stream 11 (i.e. gas stream 2/11) enters the reaction vessel via channel D of the burner. Another portion of the gas stream comprising carbon dioxide 1 or preheated gas stream comprising carbon dioxide 10 enters the reaction vessel via channel E of the burner.

FIG. 7 and FIG. 8 illustrate the total carbon dioxide conversion and total carbon monoxide produced for different RWGS reactor temperatures for two different cases: when the feed streams are not preheated (as illustrated in FIG. 1) and when they are preheated (as illustrated in FIG. 3).

TABLE 1

| Temp. (° C.) | 1000 | 1100 | 1200 | 1300 | 1000 | 1100 | 1200 | 1300 |
|---|---|---|---|---|---|---|---|---|
| $H_2/CO_2$ | 3 | 3 | 3 | 3 | 3 | 3 | 3 | 3 |
| Feed Preheat | No | No | No | No | Yes | Yes | Yes | Yes |
| Product stream composition (mole %) | | | | | | | | |
| $H_2$ | 42.25 | 39.89 | 37.66 | 35.53 | 45.04 | 42.75 | 40.59 | 38.52 |
| CO | 15.94 | 16.57 | 17.02 | 17.35 | 16.80 | 17.41 | 17.85 | 18.17 |
| $CO_2$ | 9.06 | 8.43 | 7.98 | 7.65 | 8.19 | 7.59 | 7.15 | 6.83 |
| $H_2O$ | 32.74 | 35.11 | 37.34 | 39.47 | 29.96 | 32.25 | 34.41 | 36.48 |
| $CH_4$ | 0.01 | 0.00 | 0.00 | 0.00 | 0.01 | 0.00 | 0.00 | 0.00 |
| Total | 100.00 | 100.00 | 100.00 | 100.00 | 100.00 | 100.00 | 100.00 | 100.00 |

That we claim:

1. A process for converting carbon dioxide and hydrogen into a product stream comprising carbon monoxide, water and hydrogen, the process comprising introducing carbon dioxide, hydrogen and oxygen into a reaction vessel, and performing a reverse water gas shift reaction at elevated temperature, wherein
   (a) no catalyst is present in the reaction vessel, and
   (b) at least a gas stream comprising carbon dioxide, a hydrogen rich gas stream and an oxygen rich gas stream are introduced into the reaction vessel in separate feed streams, wherein the hydrogen rich gas stream is introduced into the reaction vessel at a temperature between 15 and 450° C.,
   (c) the hydrogen rich gas stream and oxygen rich gas stream being introduced in close vicinity of each other, wherein at least the hydrogen rich gas stream and the oxygen rich gas stream are introduced into the reaction vessel via a burner comprising coaxial channels for the separate introduction of the different gas streams, the burner being located at the top of the reaction vessel, wherein the hydrogen and oxygen in the hydrogen rich gas stream and oxygen rich gas stream undergo a combustion reaction upon entering the reaction vessel, thereby providing the heating energy required for the reverse water-gas shift reaction; and
   (d) the temperature in the reaction vessel is maintained in the range of 1000 to 1500° C. by varying the molar ratio of hydrogen to oxygen, which are introduced into the reaction vessel in the hydrogen rich gas stream and oxygen rich gas stream, respectively.

2. The process according to claim 1, wherein in step (c) the hydrogen rich gas stream and oxygen rich gas stream are introduced into the reaction vessel in close vicinity of but not next to each other.

3. The process according to claim 1, wherein part of the gas stream containing carbon dioxide is introduced via a channel in between the hydrogen rich gas stream and the oxygen rich gas stream, the oxygen rich gas stream being introduced via the inner channel of the burner, and the remaining part of the gas stream containing carbon dioxide is introduced in an outer channel of the burner, being outside of the channels for the hydrogen rich gas stream and oxygen rich gas stream.

4. The process according to claim 1, wherein the reaction vessel is preheated to a temperature ranging up to 1100° C.

5. The process according to claim 1, wherein the product stream leaving the hot reaction vessel is cooled with water to provide a cooled product mixture comprising carbon monoxide and hydrogen, steam and optionally unconverted carbon dioxide.

6. The process according to claim 5, wherein the product stream or steam produced after cooling the product stream is used to preheat one or more of the feed gas streams selected from the gas stream comprising carbon dioxide, the hydrogen rich gas stream, the oxygen rich gas stream, and optionally additional gas streams introduced into the reaction vessel as co-feed or pre-mixed gas streams.

7. The process according to claim 1, wherein at least part of the hydrogen rich gas stream and/or at least part of the oxygen rich gas stream in the feed is obtained from a water splitter.

8. The process according to claim 7, wherein the oxygen rich gas stream from the water splitter is liquified and re-gasified before use as feed.

9. The process according to claim 5, wherein steam is separated from the product mixture and then further cooled to the dew point to provide liquid water which is recycled to a water splitter to produce hydrogen and/or oxygen.

\* \* \* \* \*